US008104545B2

(12) United States Patent
Valentini

(10) Patent No.: US 8,104,545 B2
(45) Date of Patent: Jan. 31, 2012

(54) HANDGRIP FOR A PNEUMATIC MACHINE FOR MACHINING SURFACES

(76) Inventor: Guido Valentini, Milan (IT)

( * ) Notice: Subject to any disclaimer, the term of this patent is extended or adjusted under 35 U.S.C. 154(b) by 50 days.

(21) Appl. No.: 12/632,289

(22) Filed: Dec. 7, 2009

(65) Prior Publication Data

US 2010/0147543 A1 Jun. 17, 2010

(30) Foreign Application Priority Data

Dec. 11, 2008 (IT) ............................ MI20080407 U

(51) Int. Cl.
*B23B 45/04* (2006.01)

(52) U.S. Cl. ....................................... 173/168; 173/218

(58) Field of Classification Search ........................ None
See application file for complete search history.

(56) References Cited

U.S. PATENT DOCUMENTS

| | | | | |
|---|---|---|---|---|
| 1,613,172 | A * | 1/1927 | Theodor | 173/16 |
| 4,102,084 | A | 7/1978 | Bloomquist | |
| 4,258,798 | A * | 3/1981 | Campbell et al. | 173/168 |
| 4,476,942 | A * | 10/1984 | Elkin | 173/169 |
| 5,301,471 | A * | 4/1994 | Fisher et al. | 451/357 |
| 5,417,294 | A * | 5/1995 | Suher | 173/15 |
| 6,149,356 | A * | 11/2000 | Chu et al. | 408/56 |
| 6,155,354 | A * | 12/2000 | Pusateri et al. | 173/170 |
| 6,161,628 | A * | 12/2000 | Liu | 173/168 |
| 6,163,094 | A * | 12/2000 | Jansson | 310/89 |
| 6,443,239 | B1 * | 9/2002 | Izumisawa | 173/169 |
| 6,612,476 | B2 * | 9/2003 | Smolinski | 227/120 |
| 6,923,272 | B2 * | 8/2005 | Jansson et al. | 173/169 |
| 6,991,043 | B1 * | 1/2006 | Chen | 173/169 |
| 7,140,451 | B2 * | 11/2006 | Yoshimizu et al. | 173/217 |
| 7,207,394 | B2 * | 4/2007 | Young et al. | 173/218 |
| 7,475,739 | B2 * | 1/2009 | Wuensch | 173/168 |
| 7,484,649 | B2 * | 2/2009 | Schnell et al. | 227/130 |
| 7,770,660 | B2 * | 8/2010 | Schroeder et al. | 173/217 |
| 7,896,103 | B2 * | 3/2011 | Johnson et al. | 173/211 |
| 2002/0104666 | A1 * | 8/2002 | McCallops et al. | 173/168 |
| 2004/0231868 | A1 * | 11/2004 | Hall | 173/169 |
| 2007/0056758 | A1 * | 3/2007 | Chen | 173/169 |
| 2007/0289763 | A1 * | 12/2007 | Wiker et al. | 173/162.2 |
| 2009/0165610 | A1 * | 7/2009 | Hachisuka | 81/489 |
| 2009/0242225 | A1 * | 10/2009 | Chen | 173/168 |

FOREIGN PATENT DOCUMENTS

| | | | |
|---|---|---|---|
| DE | 39 13 971 | A1 | 11/1989 |
| DE | 20 2007 011739 | U1 | 12/2007 |
| EP | 2 113 342 | A1 | 11/2009 |
| FR | 2 441 454 | A3 | 6/1980 |
| JP | 11 239985 | A | 9/1999 |
| WO | 2007 048435 | A1 | 5/2007 |

OTHER PUBLICATIONS

European Search Report (EP 09 17 8016) dated Nov. 24, 2010
English Language Abstracts of JP 11239985 A and FR 2441454.

* cited by examiner

*Primary Examiner* — Lindsay Low
(74) *Attorney, Agent, or Firm* — Novak Druce + Quigg LLP

(57) ABSTRACT

A handgrip (1) for pneumatic machines (2) for machining surfaces, includes adjacent to one another, a delivery pipe (3) and a discharge pipe (4) for discharging the compressed air. The handgrip (1) consists of a first side cap (5) and of a second side cap (6) that are associated to enclose ergonomically the delivery pipes (3) and discharge pipes (4).

4 Claims, 3 Drawing Sheets

HANDGRIP FOR A PNEUMATIC MACHINE FOR MACHINING SURFACES

CROSS-REFERENCE TO RELATED APPLICATIONS

This application claims priority to Italian Patent Application MI2008U000407, filed Dec. 11, 2008, the entire contents of which are incorporated herein by reference.

FIELD OF THE INVENTION

This invention relates to a handgrip for pneumatic machines for machining surfaces.

BACKGROUND OF THE INVENTION

Pneumatic machines, for example manual polishing and lapping machines, are provided with a stiff delivery pipe for the compressed air and a stiff return pipe for the used air for driving the backing pad.

It is known that the delivery and return pipes are superimposed and substantially constitute the handgrip of the machine. If present, the driving lever is mounted on the upper pipe.

Substantially, it is a type of handgrip with a shape that is dictated by the pneumatic functional needs of the machine, with a vertical section in the shape of an "8" and is therefore certainly not ergonomic.

Said "8"-shaped section is poorly adapted to the classic non-pneumatic cylindrical casings of non-pneumatic machines that are obtained with stiff tubes for reasons of space, assembly and accessibility.

Solutions are known that involve attaching small flat plastic inserts to the sides of the "8" such as to cover at least the space between the two overlapping pipes. However, the efficacy of the handgrip is not increased and entails a further processing step.

SUMMARY OF THE INVENTION

The object of this invention is to make a handgrip for a pneumatic machine for machining surfaces that is ergonomic and easy to assemble.

According to the invention, this object is obtained by means of a handgrip for a pneumatic machine for machining surfaces comprising, placed alongside one another, a supply pipe for supplying the compressed air and a discharge pipe for discharging the waste air and possible aspirated machining dust, characterised in that it consists of a first side cap and of a second side cap that are associated to enclose ergonomically said supply pipes and discharge pipes.

BRIEF DESCRIPTION OF THE DRAWINGS

These and other features of the present invention will be made clearer from the following detailed description of an embodiment thereof, illustrated by way of non-limiting example in the attached drawings, in which.

DETAILED DESCRIPTION

Figure 1:
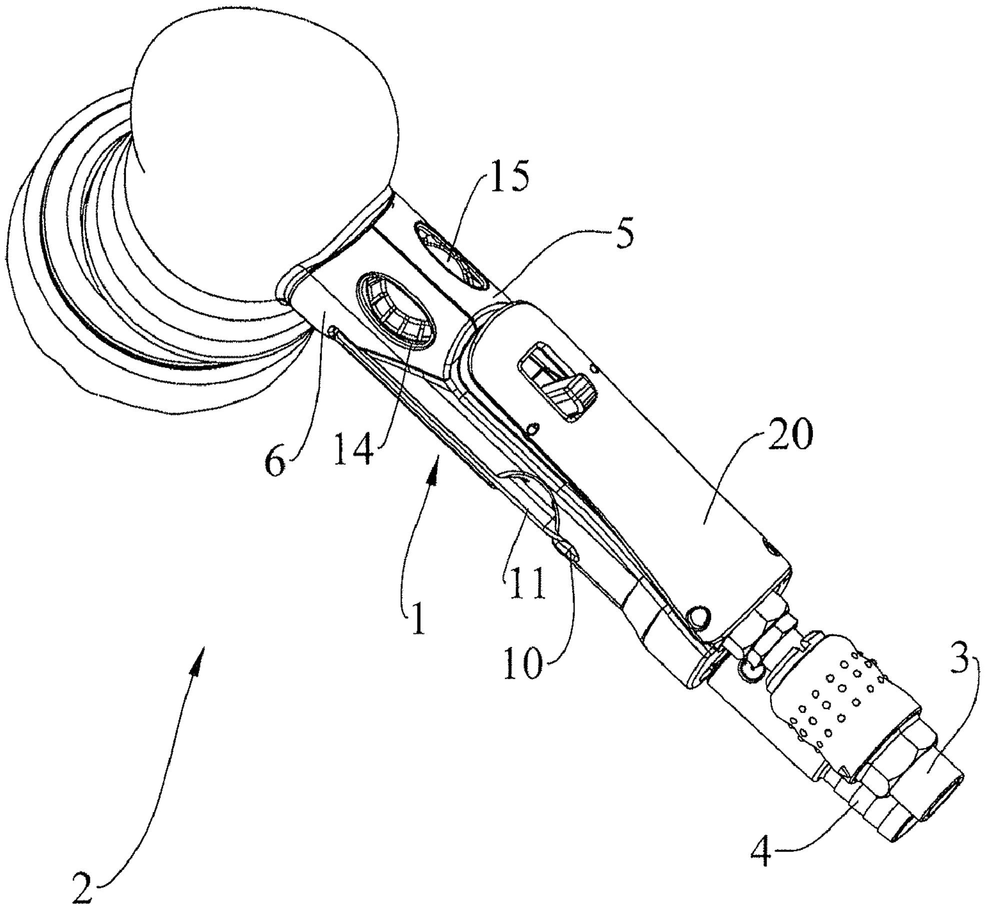
FIG. 1 shows a perspective top view of a tool according to the invention.

In FIG. 1 there is shown a pneumatic polishing machine 2 comprising a supply pipe 3 for supplying the compressed air and a discharge pipe 4 for discharging the waste air that are adjacent, the one 3 above the other 4, such as substantially to form an "8".

The aforesaid discharge pipe 4, in the case of a polishing machine, also has the function of discharging the aspirated machining dust.

Said polishing machine 2 is provided with an ergonomic handgrip 1 consisting of a first side cap 5 and of a second side cap 6 that by coupling together ergonomically cover the pipes 3 and 4.

Figure 2:
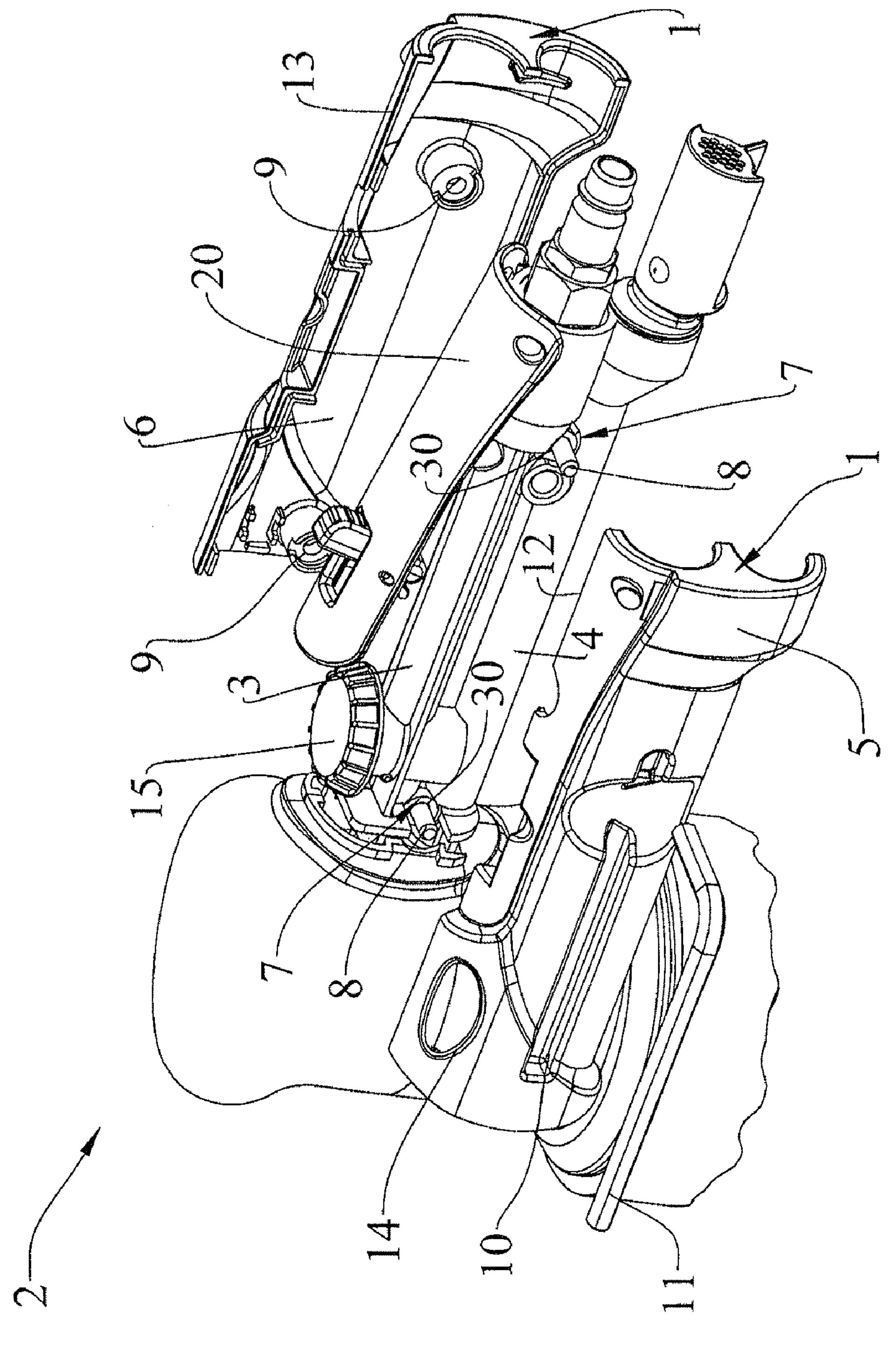
FIG. 2 shows an exploded perspective view of the tool in FIG. 1.
Figure 3:
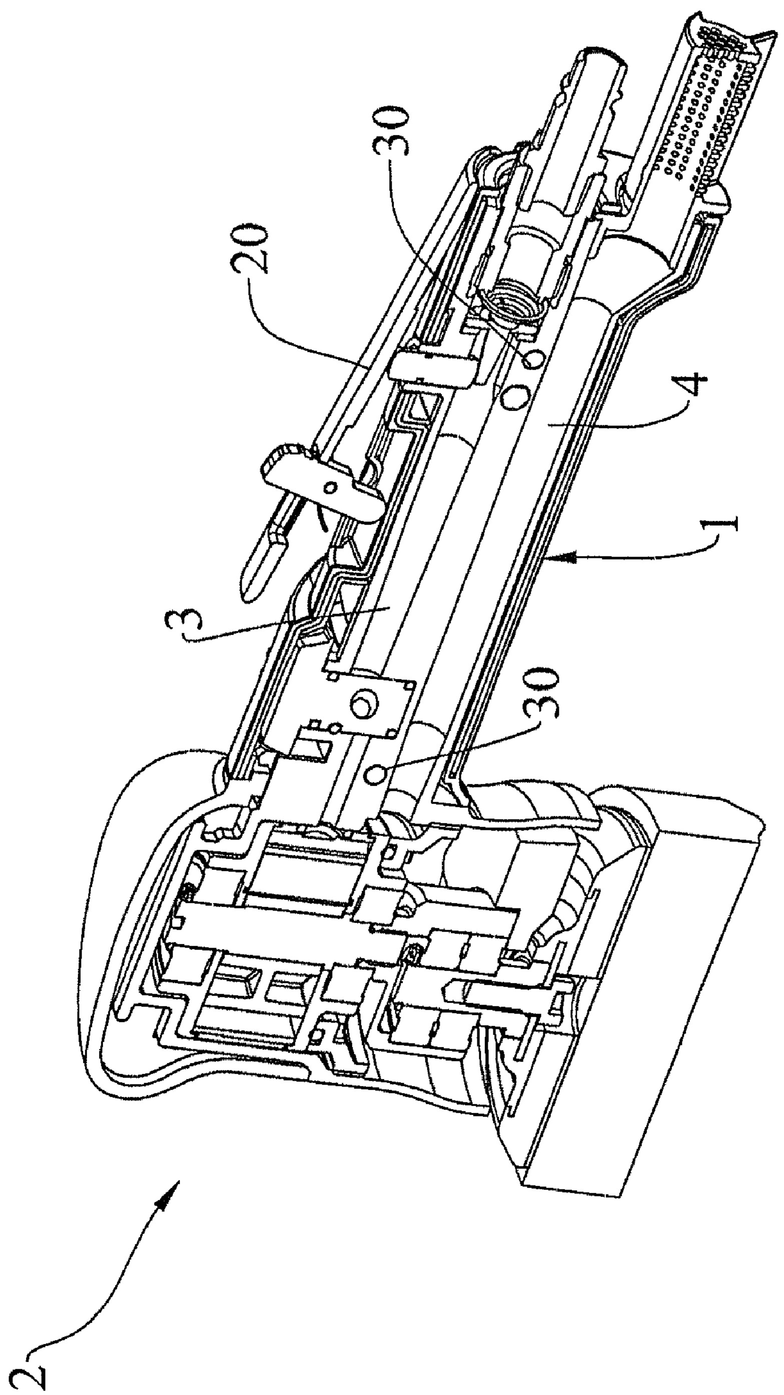
FIG. 3 shows a longitudinal vertical section view of the tool in FIG. 1.

In FIG. 2 there are seen two fixing elements 7 with a threaded through hole 30 that are mounted between the two pipes 3-4 which are suitable for coupling with external screws 8 that also engage with threaded holes 9 located on both the caps 5 and 6.

The cap 5 has a housing 10 for a tool 11, for example an Allen key, as shown in the present embodiment.

To mount the handgrip, the following procedure is followed: the caps 5 and 6 are brought close to one another, and the external screw 8 is inserted first into the through hole 9 of the cap 6, then through the elements 7 and lastly into the non-through hole 9 of the cap 5, to obtain semipermanent fixing between the caps 5 and 6. Fixing is reversible and the caps can be opened to enables the pipes 3 and 4 to be inspected and possibly repaired.

The caps 5 and 6 are shaped so as to enclose the pipes 3 and 4 and to and to make the pipes 3 and 4 fit snugly together at the respective edges 12 and 13.

The caps 5 and 6 can be advantageously provided with windows 14 to enable access to controls 15 of the tool 2 below the caps 5 and 6.

Above the assembled handgrip 1 a driving lever 20 is assembled.

The handgrip 1 can be advantageously moulded from plastics.

It is possible to shape the caps 5-6 so as to cover also a possible third pipe for aspirating dust.

The invention claimed is:

1. A handgrip (1) for pneumatic machine (2) for machining surfaces comprising, adjacent to one another, a supply pipe (3) for supplying the compressed air and a discharge pipe (4) for discharging the used air and possible aspirated machining dust, characterised in that it consists of a first side cap (5) and of a second side cap (6) associated to enclose ergonomically said supply pipes (3) and discharge pipes (4), wherein the first side cap (5) and the second side cap (6) are provided with holes (9) suitable for engaging with external fixing screws (8) for fixing to fixing elements (7) to be interposed between the pipes (3, 4) and which are integral therewith, for semipermanent fixing of the handgrip (1) to the pipes (3, 4).

2. The handgrip (1) according to claim 1 said handgrip comprising at least a housing (10) for at least a tool (11) in at least one of the caps (5, 6).

3. The handgrip (1) according to claim 1 wherein the caps (5, 6) comprise windows (14) to enable access to controls (15) below the caps (5, 6).

4. Pneumatic machine (2) for machining surfaces comprising a supply pipe (3) and a discharge pipe (4) for discharging the waste air that are placed alongside one another comprising a handgrip according to claim 1.

* * * * *